United States Patent
Saeedi et al.

(10) Patent No.: US 10,708,624 B1
(45) Date of Patent: Jul. 7, 2020

(54) PRE-PROCESSING FOR VIDEO COMPRESSION

(71) Applicant: ATI TECHNOLOGIES ULC, Markham (CA)

(72) Inventors: Mehdi Saeedi, Markham (CA); Boris Ivanovic, Markham (CA); Tomasz Stolarczyk, Markham (CA); Ihab Amer, Markham (CA); Gabor Sines, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/426,487

(22) Filed: May 30, 2019

(51) Int. Cl.
*H04N 19/85* (2014.01)
*H04N 19/50* (2014.01)
*H04N 19/182* (2014.01)
*H04N 19/117* (2014.01)
*H04N 19/124* (2014.01)
*H04N 19/176* (2014.01)

(52) U.S. Cl.
CPC ........ *H04N 19/85* (2014.11); *H04N 19/117* (2014.11); *H04N 19/124* (2014.11); *H04N 19/176* (2014.11); *H04N 19/182* (2014.11); *H04N 19/50* (2014.11)

(58) Field of Classification Search
USPC .................................................. 375/240.12
See application file for complete search history.

(56) References Cited

U.S. PATENT DOCUMENTS

| | | | |
|---|---|---|---|
| 10,319,094 B1* | 6/2019 | Chen ..................... | G06T 7/0026 |
| 2015/0023420 A1* | 1/2015 | Minezawa .......... | H04N 19/107 |
| | | | 375/240.13 |
| 2018/0262756 A1* | 9/2018 | Filippov ................ | H04N 19/13 |
| 2020/0036972 A1* | 1/2020 | Kanoh ................... | H04N 19/82 |

OTHER PUBLICATIONS

Vidal,E. et al., "New Adaptive Filters as Perceptual Preprocessing for Rate-Quality Performance Optimization of Video Coding," Signal Processing: Image Communication, Elsevier, Sep. 22, 2017; pp. 124-137 <<https://hal.archives-ouvertes.fr/ha-01591984>>.

* cited by examiner

*Primary Examiner* — Behrooz M Senfi

(57) ABSTRACT

A processing system filters blocks of a picture to minimize a size and error of the blocks prior to encoding. A pre-processing module of the processing system measures characteristics of a plurality of blocks and evaluates the effects of applying each of a plurality of filters to the blocks prior to encoding in order to predict an increase in compressibility of blocks having similar characteristics that are filtered with each filter before being encoded, with the least impact on quality. The pre-processing module trains models to predict a size and error of blocks filtered with each filter based on block characteristics. The pre-processing module uses the models to calculate a cost in terms of size and error of applying each filter to a given block having certain characteristics. The pre-processing module then applies to the block the filter that is predicted to result in the best cost.

20 Claims, 6 Drawing Sheets

PRE-PROCESSING FOR VIDEO COMPRESSION

BACKGROUND

A multimedia server generates data representative of pictures in a multimedia stream, e.g., a multimedia stream that has been requested by a user. An encoder of the multimedia server encodes the data for each picture to form a bitstream that is transmitted over a network to a decoder that decodes the bitstream and provides the decoded video information to a multimedia application or any other application for display to the user. Such multimedia encoders and decoders are used in a wide variety of applications to facilitate the storage and transfer of multimedia streams in a compressed fashion.

To compress multimedia streams, conventional encoders implement video compression algorithms in which the degree of compression depends in part on a quality parameter such as a quantization parameter. A quantization parameter is a number that can be used to derive a standard matrix for quantizing transformed data in a codec. A higher quantization parameter often results in lower bit usage for a picture, whereas a lower quantization parameter often results in higher bit usage for the picture. Compression algorithms use different quantization parameters that affect the allocation of bits to titles, frames, slices, and blocks of pictures. However, using a quantization parameter that is too low results in the unnecessary consumption of computing resources and bandwidth in encoding, transmitting, and decoding of pictures, without any commensurate benefit. On the other hand, using a quantization parameter that is too high results in unnecessarily (or unacceptably) reduced quality of encoded pictures. In addition, changing the quantization parameter of a picture can lead to an unpredictable loss in quality.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
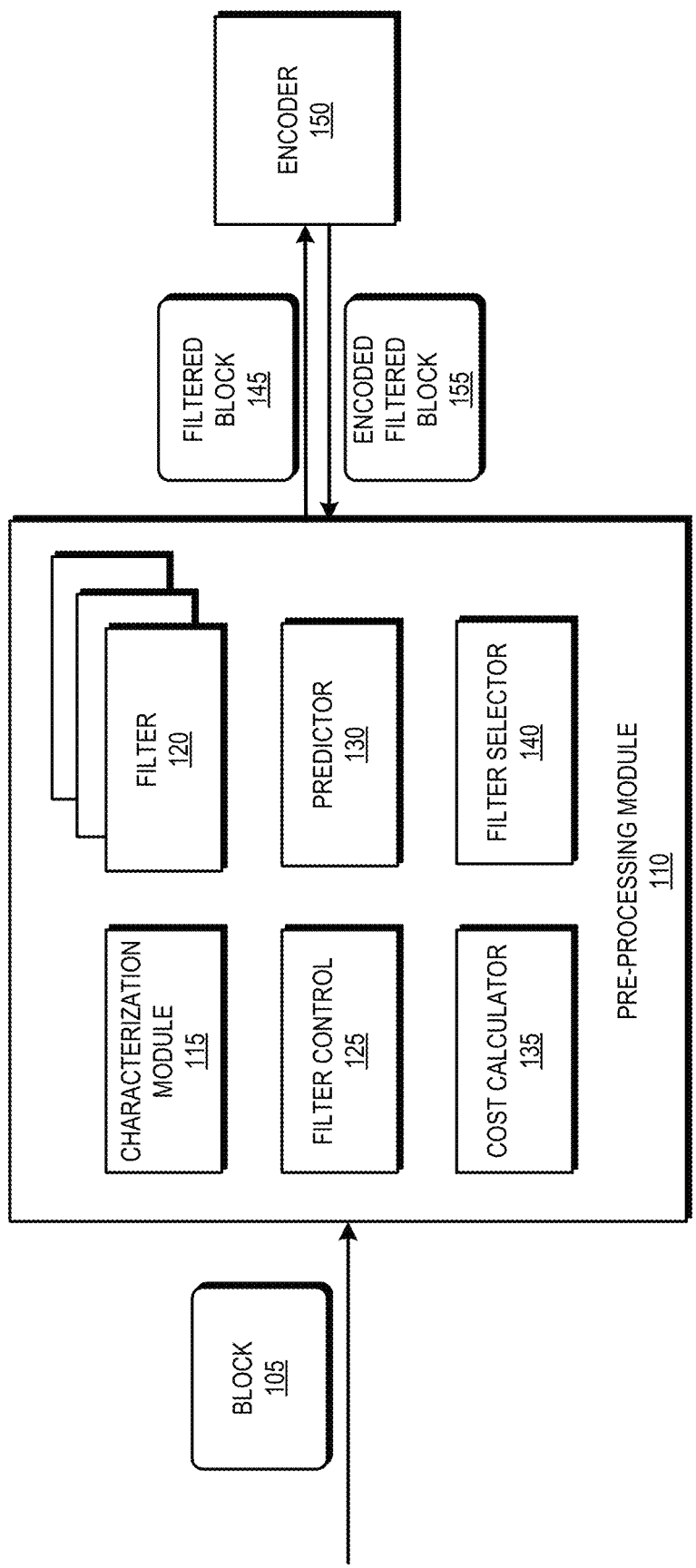
FIG. 1 is a block diagram of a processing system that includes a pre-processing module to select and apply a pre-processing filter to a block of a picture to be encoded based on a cost analysis in accordance with some embodiments.

FIGS. 1-6 illustrate processing systems and techniques for pre-processing a portion, or block, of a picture using a filter to minimize a size and error of the block prior to encoding of a multimedia stream. A pre-processing module of the processing system measures characteristics of a plurality of blocks using a plurality of metrics and evaluates the effects of applying each of a plurality of filters (or a filter with a plurality of settings) to the blocks prior to encoding in order to predict an increase in compressibility of blocks having similar characteristics that are filtered with each filter before being encoded using a given quantization parameter, with the least impact on quality. The pre-processing module develops and trains models to predict a size and error of blocks filtered with each of the plurality of filters based on characteristics of the blocks. The pre-processing module uses the models to calculate a cost in terms of size and error resulting from applying each filter to a given block of a picture based on characteristics of the block. The pre-processing module then applies to the block the filter that is predicted to result in the best cost (e.g. the smallest size (i.e., lowest bit usage) while having least impact on quality). By pre-processing the blocks of a picture by applying a filter calculated to result in a low cost, the pre-processing module increases the compressibility of the picture when encoded using a given quantization parameter with a predictable amount of quality loss.

Blocks having different characteristics will be affected differently when filtered with a given filter. The pre-processing module characterizes each block of a picture by measuring multiple characteristics, such as colorfulness, contrast, or noisiness, of the block. In some embodiments, the pre-processing module characterizes the block at a plurality of spatial compression scales and/or dynamic range scales by calculating a gradient of the block at each spatial scale and/or dynamic range to generate a "multi-scale metric" of the block. Each block includes a degree of fine or coarse detail, contrast, structures, color, brightness. Pixel activity such as variations of pixel intensities within a portion may be used to detect edges, repeating patterns, and other structures or objects in an image. Pixel activity can be measured using various metrics such as, for example, using a graylevel co-occurrence matrix, a two-dimensional spatial mean gradient, wavelet or other transforms, discrete cosine function, or average value within a portion.

A single measurement of pixel activity such as 2D spatial gradient or wavelet transform can result in similar measurements for blocks that are actually dissimilar, such as block including a carpet versus a block including a plain sheet of white paper. By analyzing the pixel activity level of each block at a plurality of spatial scales and/or dynamic ranges, the pre-analysis module generates a robust characterization of the block that indirectly indicates how bit allocation or assignment of a given QP will affect the perceptual quality of the block. In some embodiments, the multi-scale metric includes an indication of the presence of skin tone within a block. Blocks that have similar multi-scale metrics, as measured by, e.g., Cartesian difference between multi-scale metrics, are likely to be visually similar and to be similarly affected by application of a given filter having particular control settings.

In some embodiments, rather than apply all N filters to each block and then select the filter having the lowest cost, the pre-processing module trains a model using a large number of blocks from selected training videos to predict a cost for each filter when applied to a particular block. To train the model, the pre-processing module characterizes each of the blocks from the training videos using the multi-scale metric or another measure of characteristics of each block. The pre-processing module applies a first filter, having first control settings, to each block of the training videos and encodes the filtered blocks with a specific quantization parameter using a targeted encoder. The pre-processing module calculates the size (i.e., bit usage) and an error metric to measure distortion introduced by filtering for each encoded filtered block of the training videos. Based on the characteristics, calculated sizes, and calculated errors for each of the blocks, the pre-processing module develops a regressive model, such as least squares, random forest regressor, or other machine learning model, to predict a size of a given block having particular characteristics when filtered using the first filter and encoded using the specific quantization parameter. The pre-processing module similarly develops a regressive model to predict an error for a given block having particular characteristics when filtered using the first filter and encoded using the specific quantization parameter. The pre-processing module then repeats the process of applying a filter, encoding, calculating sizes and errors, and developing a regressive model for each of the remaining N−1 filters. In some embodiments, the pre-processing module also repeats the process of applying a filter, encoding, calculating sizes and errors, and developing a regressive model for any additional quantization parameters that may be used for encoding the blocks.

Once the pre-processing module has developed a model for each filter and/or quantization parameter of interest, the pre-processing module applies the models and calculates a cost for each filter option to select a lowest cost filter for pre-processing blocks of a picture of interest. For each block of a picture, the pre-processing module characterizes the block and then calculates a predicted size for the block when filtered with each of the N filters, based on the block's characteristics and the size model, and calculates a predicted error for the block when filtered with each of the N filters, based on the block's characteristics and the error model. For each of the N filters, the pre-processing module calculates a cost that is a function of the predicted size and error that would result from applying the filter to the block, based on the block's characteristics. In some embodiments, the pre-processing module applies a filter to a block in response to the cost of the filter being below a threshold. In some embodiments, the pre-processing module compares the calculated costs for each of the filters and selects the filter having the best (least) cost to apply to the current block. The pre-processing module repeats the process of applying the models and calculating costs to select the lowest cost filter for each block of the picture. After pre-processing the picture by applying the lowest cost filter to each block of the picture, the pre-processing module provides the filtered picture to the encoder for encoding. The encoder encodes each block of the picture using a specified quantization parameter. The encoder transmits the encoded picture over a network to a decoder that decodes the bitstream and provides the decoded video information to a multimedia application for display to the user. Pre-processing pictures with low-cost filters reduces bit usage (i.e., increases compressibility) with little or no visible effect.

FIG. 1 illustrates a processing system 100 that includes a pre-processing module 110 to select and apply a pre-processing filter 120 to a block of a picture based on a cost analysis in accordance with some embodiments. The pre-processing module 110 may be implemented as hard-coded logic, programmable logic, software executed by a processor, or a combination thereof. In some embodiments, the processing system 100 is distributed across a variety of electronic devices, such as a server, personal computer, tablet, set top box, gaming system, mobile phone, and the like.

The pre-processing module 110 includes a characterization module 115, a plurality of filters 120, a filter control 125, a predictor 130, a cost calculator 135, and a filter selector 140, each of which may be implemented as hard-coded logic, programmable logic, software executed by a processor, or a combination thereof. The processing system 100 receives digital information that represents a stream or sequence of pictures in a multimedia stream. The term "multimedia" refers to a stream of data including video data, audio data, and the like, or a combination thereof, and in some embodiments also include control data, metadata, and the like, or any combination thereof. The processing system 100 divides each picture into coding units such as macroblocks, coding tree blocks (CTBs), titles, and slices, referred to herein as "blocks", which are provided to the pre-processing module 110.

The characterization module 115 analyzes each block and characterizes the blocks according to metrics such as spatial gradient, colorfulness, contrast, or noisiness. In some embodiments, the characterization module 115 characterizes the blocks using a multi-scale metric that indicates pixel activity of the block measured at a plurality of spatial scales and dynamic ranges. In such embodiments, the characterization module 115 employs a video/image scaler (not shown) that adjusts the spatial scale of each block and a dynamic range modulator (not shown) that adjusts the dynamic range of each block while the characterization module 115 calculates pixel activity for each block at each spatial scale and dynamic range setting. "Spatial scale" refers to the number of pixels represented by the block, and a pixel is the smallest addressable element in a display device. For example, in some embodiments, the video/image scaler rescales each block to a plurality of spatial scale settings, such as 1:1, 2:1, 4:1, and 8:1, such that for a block of 16×16 pixels (i.e., a macroblock), at a 1:1 spatial scale, the block is unaltered (16×16 pixels), at a 2:1 spatial scale, the original 16×16 block is compressed to 8×8 pixels, at a 4:1 spatial scale, the block is compressed to 4×4 pixels, and at an 8:1 spatial scale, the block is compressed to 2×2 pixels. "Dynamic range" refers to the number of tonal values of a pixel. For example, in some embodiments, the dynamic range modulator applies a plurality of dynamic range settings, such as 1:1, 2:1, 4:1, and 8:1, such that for a block having an original dynamic range of 0→255 grayscale values, at a 1:1 dynamic range, the block has 0→255 grayscale values, at a 2:1 dynamic range, the block has 0→127 grayscale values, at a 4:1 dynamic range, the block has 0→63 grayscale values, and at an 8:1 dynamic range, the block has 0→31 grayscale values.

In some embodiments, the characterization module 115 low-pass filters the signal for each block before or during the scaling process to prevent aliasing. For example, in some embodiments, the characterization module 115 employs a 4-tap or 8-tap finite impulse response (FIR) filter which effectively performs low-pass filtering using a corresponding number of appropriate coefficients prior to decimation. The filtering causes blurring, which may or may not cause information to be lost, depending on the amount of detail in the block. In some embodiments, the characterization module 115 uses a recursive method in which the imagery within each block is scaled for each successive spatial scale setting as it was in the previous spatial scale setting.

At each spatial scale setting and dynamic range setting, the characterization module 115 calculates the pixel activity level for the block using a pixel activity metric. In some embodiments, the characterization module 115 calculates pixel activity for each block using a 2D spatial mean gradient. A 2D spatial mean gradient captures vertical and horizontal edges. In some embodiments, the characterization module 115 calculates pixel activity of each block using a wavelet transform or other transform to measure an activity parameter for a given block. Thus, the characterization module 115 measures the amount of information (if any) that is lost at each progressive level of spatial scaling and at each dynamic range setting.

In some embodiments, the characterization module 115 generates a multi-scale metric for each block that is an N-tuple number such as a matrix representing the N pixel activity levels calculated by the characterization module 115 at each progressive level of spatial scaling and at each dynamic range setting. In some embodiments, the multi-scale metric calculator 135 uses normalized pixel activity level values (e.g., values that are normalized with respect to the maximum pixel activity value), which can be represented by a floating-point number or a fixed-point number. In some embodiments, the multi-scale metric calculator 135 generates a multi-scale metric based on the difference in values at different spatial scales and/or dynamic ranges.

Thus, for a 16-tuple multi-scale metric representing pixel activity levels measured for a block at four spatial scale settings and four dynamic range settings, the multi-scale metric in some embodiments represents the information described below in Table 1.

TABLE 1

| 1:1 spatial scale 1:1 dynamic scale Pixels under study: 16 × 16 | 2:1 spatial scale 1:1 dynamic scale Pixels under study: 8 × 8 | 4:1 spatial scale 1:1 dynamic scale Pixels under study: 4 × 4 | 8:1 spatial scale 1:1 dynamic scale Pixels under study: 2 × 2 |
|---|---|---|---|
| 1:1 spatial scale 2:1 dynamic scale Pixels under study: 16 × 16 | 2:1 spatial scale 2:1 dynamic scale Pixels under study: 8 × 8 | 4:1 spatial scale 2:1 dynamic scale Pixels under study: 4 × 4 | 8:1 spatial scale 2:1 dynamic scale Pixels under study: 2 × 2 |
| 1:1 spatial scale 4:1 dynamic scale Pixels under study: 16 × 16 | 2:1 spatial scale 4:1 dynamic scale Pixels under study: 8 × 8 | 4:1 spatial scale 4:1 dynamic scale Pixels under study: 4 × 4 | 8:1 spatial scale 4:1 dynamic scale Pixels under study: 2 × 2 |
| 1:1 spatial scale 8:1 dynamic scale Pixels under study: 16 × 16 | 2:1 spatial scale 8:1 dynamic scale Pixels under study: 8 × 8 | 4:1 spatial scale 8:1 dynamic scale Pixels under study: 4 × 4 | 8:1 spatial scale 8:1 dynamic scale Pixels under study: 2 × 2 |

From left to right, the components of the multi-scale metric as depicted in Table 1 reflect the contribution of details from fine to coarse. From top to bottom, the components of the multi-scale metric as depicted in Table 1 reflect the contribution of details from all contrast levels to high contrast only. The contributions of details from fine to coarse and from all contrast levels to high contrast only relate directly to the discrete cosine transform (DCT) and direct sine transform (DST) or wavelet transforms that underlie many video and image compression algorithms. Pre-processing module 110 uses the multi-scale metric or another measure of characteristics of blocks to train a regressive model or machine learning model to select a filter for pre-processing each block based on budgetary or perceptual targets.

Each of the plurality of filters 120 selectively removes information from the blocks to which they are applied. In some embodiments, each of the plurality of filters 120 is the same type of filter but is adjusted to different settings than the other filters of the plurality of filters 120. In some embodiments, each filter is be a different type of filter than the other filters. For example, in some embodiments, each of the plurality of filters 120 a bilateral blurring filter having different control settings. In other embodiments, a first filter of the plurality of filters 120 is one of a bilateral blurring filter, a temporal filter, a spatio-temporal filter, a motion-compensated filter, or other type of filter, and a second filter of the plurality of filters 120 is a different one of a bilateral blurring filter, a temporal filter, a spatio-temporal filter, a motion-compensated filter, or other type of filter. A bilateral blurring filter is a non-linear, edge-preserving, noise-reducing smoothing filter that replaces the intensity of each pixel with a weighted average of intensity values from nearby pixels. A temporal filter performs a weighted average of successive frames. A spatio-temporal filter compresses images and videos by removing spatial, temporal, and visual redundancies. A motion compensation filter predicts a frame in a video, given the previous or future frames by accounting for motion of the camera or objects in the video.

In some embodiments, each of the plurality of filters 120 is a bilateral blurring filter that applies a Gaussian blur within a given radius. Each filter 120 has a control setting adjustable by the filter control 125 to set a threshold value for a difference in values, such as luminance, between a sample pixel (also referred to as a pixel under study) compared to nearby candidate pixels in order for a candidate pixel to be included in a blur with the pixel under study. The filter control 125 further adjusts a control setting for each filter 120 to set a threshold distance between the pixel under study and candidate pixels (that also meet the difference threshold) for inclusion in the blur. Thus, each filter 120 is a bilateral blurring filter having different control settings for a difference threshold and distance threshold. For example, in some embodiments, a first filter 120 is a bilateral blurring filter with a control setting for the threshold difference in values allowing for a relatively small difference in values between pixels (e.g., less than 5%) for inclusion in a blur and a control setting for the distance threshold between pixels allowing for pixels within a radius of X pixels from a sample pixel (and also meeting the difference threshold) to be included in the blur. A second filter 120 in some embodiments is a bilateral blurring filter with a control setting for the threshold difference in values between pixels (e.g., less than 25%) allowing for a relatively larger difference in values between pixels for inclusion in the blur and a control setting for the threshold distance between pixels allowing for pixels within a radius of Y pixels from the sample pixel (and also meeting the difference threshold) to be included in the blur. In some embodiments, the filter control 125 applies different control settings to the filters 120 to effectively apply N filters to each block. In some embodiments, the differences in control settings for each of the N filters are monotonic, and in other embodiments the differences in control settings for each of the N filters are not monotonic.

After the pre-processing module 110 applies a first filter of the filters 120 to a block 105 to generate a filtered block 145, the pre-processing module 110 encodes the filtered block 145, either using an encoder of the pre-processing module (not shown) or by providing the filtered block to an encoder 150 external to the pre-processing module 110. The encoder 150 encodes (compresses) the filtered block 145 using a specific quantization parameter to generate an encoded filtered block 155. The predictor 130 collects the compressed size (bit usage) of the encoded filtered block 155 that has been filtered using the first filter and encoded using the specific quantization parameter and calculates an error metric such as mean squared error (MSE) for the encoded filtered block 155.

In some embodiments, the pre-processing module 110 characterizes, filters, encodes, and measures the sizes and errors of a large number of blocks (e.g., millions of blocks) at training time using each of the N filters 120. Based on the characteristics of each block and the collected sizes and errors of each block when filtered and encoded with each of the N filters, the predictor 130 develops a regressive model using least squares, random forest regressor, or other machine learning techniques to output a predicted size of a block when filtered with each of the N filters 120 and encoded using a given quantization parameter, based on the block's characteristics. The predictor 130 also develops a regressive model using least squares, random forest regressor, or other machine learning techniques to output a predicted error of a block when filtered with each of the N filters 120 and encoded using a given quantization parameter, based on the block's characteristics. The pre-processing module 110 trains the size and error models for each of the N filters 120 and for each quantization parameter of interest.

After training the models, to pre-process a picture of interest, the processing system 100 divides the picture into blocks. The characterization module 115 characterizes each block of the picture, and the predictor 130 calculates a size model and error model for the block for each of the N filters 120, given each block's characterization. The cost calculator 135 calculates a cost function for each of the N filters each block based on the predicted sizes and errors of the block, given the block's characterization. For example, in some embodiments in which n is a particular filter 120, multiscale metric coefficients are the multi-scale metric results for the block under study, and QP is the quantization parameter, the cost function is $$\text{Cost} = (\text{size}_{model}(n, \text{multiscale metric coefficients}, QP))^2 * \sqrt{\text{error}_{model}(n, \text{multiscale metric coefficients}, QP)}$$

Based on the cost function for each of the N filters 120 (and, in some embodiments, for each quantization parameter of interest), the filter selector 140 selects the filter having the best (lowest) cost to be applied to each block, based on the block's characterization. The pre-processing module 110 repeats the pre-processing for each block of the picture, applying the selected filter 120 to each block of the picture. The pre-processing module 110 provides the filtered picture to the encoder 150 for encoding.

Figure 2:
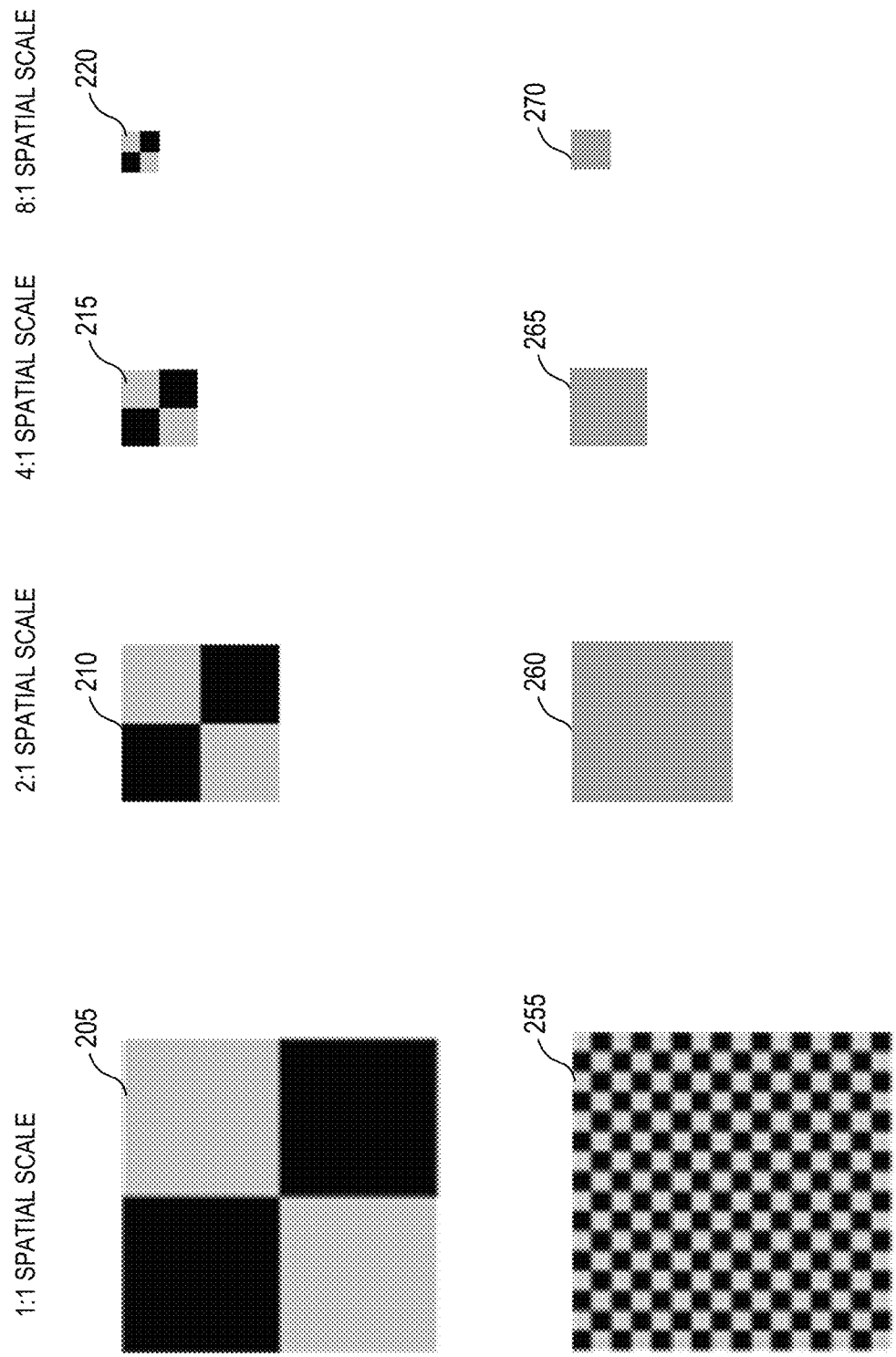
FIG. 2 is an illustration of the effects of varying the spatial scales of two sample blocks in accordance with some embodiments.

FIG. 2 illustrates the effects of varying the spatial scales of two sample blocks 205 and 255 for purposes of calculating a multi-scale metric in accordance with some embodiments. Blocks 205 and 255 are illustrated at a 1:1 spatial scale. Block 205 is a checkerboard pattern of four squares, with black squares at the upper left and lower right quadrants and light gray squares at the upper right and lower left quadrants. Block 255 is a checkerboard pattern of 256 squares, with 16 columns and 16 rows of alternating black and light gray squares.

When the spatial scale for blocks 205 and 255 is adjusted to a 2:1 spatial scale, resulting in blocks 210 and 260, respectively, block 210 retains the perceptual characteristics of block 205, in that block 210 also appears as a checkerboard pattern of four squares, with black squares at the upper left and lower right quadrants and light gray squares at the upper right and lower left quadrants. By contrast, at a 2:1 reduction in spatial scale, the checker pattern of block 260 is no longer apparent in block 255.

When the spatial scale for blocks 205 and 255 is further adjusted to a 4:1 spatial scale, resulting in blocks 215 and 265, respectively, block 215 still retains the perceptual characteristics of block 205, whereas block 265 appears to be a flat gray square. Similarly, when the spatial scale for blocks 205 and 255 is adjusted to an 8:1 spatial scale, resulting in blocks 220 and 270, the checkerboard pattern can still be seen in block 220, whereas block 270 appears to be a flat gray square, retaining none of the fine detail of block 255.

A multi-scale metric for reflecting the four spatial scale settings (1:1, 2:1, 4:1, and 8:1) shown in FIG. 2 at a single dynamic range setting is a 4-tuple. Assuming that the pixel activity is a 2D spatial gradient having a value between 0 and 1, with 0 indicating no vertical or horizontal edges and 1 indicating a maximum amount of vertical and horizontal edges, the pixel activity value for block 205, which is an 8×8 pixel checkerboard pattern, is 0.125, because the pattern has 1/8 of the maximum number of transitions for its size. The pixel activity value for block 210, which is the 8×8 checkerboard pattern of block 205 scaled 2:1, is 0.25, because the pattern has 1/4 of the maximum number of transitions for its size. The pixel activity value for block 215, which is the 8×8 checkerboard pattern of block 205 scaled 4:1, is 0.5, because the pattern has half of the maximum number of transitions for its size. The pixel activity value for block 220, which is the 8×8 checkerboard pattern of block 205 scaled 8:1, is 1.0, because the pattern has a maximum number of transitions for its size. Thus, the multi-scale metric for block 205, at the spatial scales illustrated as blocks 205, 210, 215, and 220, is represented as [0.125, 0.25, 0.5, 1].

Block 255, by contrast, is a 1×1 pixel checkerboard pattern which has a pixel activity value of 1.0, because the pattern has a maximum number of transitions for its size. Block 260, which has the 1×1 checkerboard pattern of block 255 scaled 2:1, has a pixel activity value of 0, because the low pass filtering of the scaling affects the pattern of the block 260 to the point that there is no activity in the signal. Blocks 265 and 270, which have the 1×1 checkerboard pattern of block 255 scaled 4:1 and 8:1, respectively, also have pixel activity values of 0, because there is no activity in the signals. Thus, the multiscale metric for block 255, at the spatial scales illustrated as blocks 255, 260, 265, and 270, is represented as [1, 0, 0, 0]. The multi-scale metric of [0.125, 0.25, 0.5, 1] indicates that the spatial gradient of block 205 doubles at each spatial scale and is therefore dominated by coarse detail that is not diminished by a reduction in spatial scale. By contrast, the multi-scale metric of [1, 0, 0, 0] indicates that the gradient of block 255 is affected by a change in spatial scale, and therefore includes a significant amount of fine detail. Thus, by incorporating measures of 2D spatial gradients or other metrics of pixel activity at a plurality of spatial scales, the multi-scale metric provides an indication of the contribution of fine and coarse details to a block.

Figure 3:
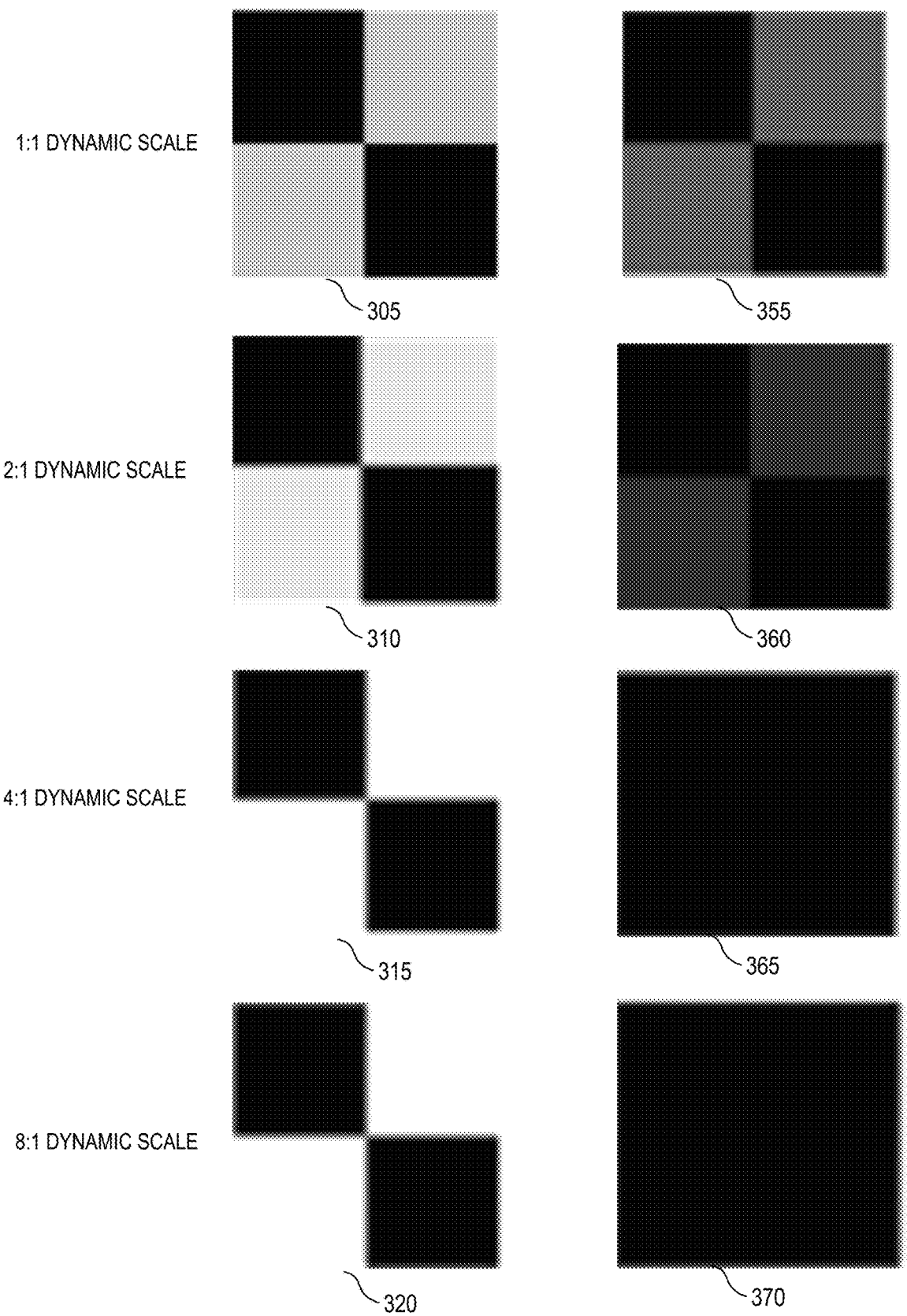
FIG. 3 is an illustration of the effects of varying the dynamic ranges of two sample blocks in accordance with some embodiments.

FIG. 3 illustrates the effects of varying the dynamic ranges of two sample blocks 305 and 355 for purposes of calculating a multi-scale metric in accordance with some embodiments. Blocks 305 and 355 are illustrated at a 1:1 dynamic range having 256 grayscale values of 0→255. Block 305 is a checkerboard pattern of four squares, with black squares at the upper left and lower right quadrants and light gray squares at the upper right and lower left quadrants.

Block 355 is a checkerboard pattern of four squares, with black squares at the upper left and lower right quadrants and dark gray squares at the upper right and lower left quadrants.

When the dynamic range for blocks 305 and 355 is adjusted to a 2:1 dynamic range scale having 128 grayscale values of 0→127, resulting in blocks 310 and 360, respectively, the light gray squares of block 310 become relatively lighter, while the black square remain black. Thus, with a 2:1 reduction in dynamic range, the gradient of block 310 is higher than the gradient of block 305. By contrast, at a 2:1 reduction in dynamic range, the gradient of block 360 is lower than the gradient of block 355, although it is still possible to discern a checkerboard pattern of block 360.

When the dynamic range for blocks 305 and 355 is further adjusted to a 4:1 dynamic range scale having 64 grayscale values of 0→63, resulting in blocks 315 and 365, respectively, the gray squares of block 305 have become nearly white as shown in block 315, while the block squares have remained black. At a 4:1 reduction in dynamic range, the gray squares of block 355 have become essentially black in block 365, such that the gradient of block 365 approaches zero. Similarly, when the dynamic range for blocks 305 and 355 is adjusted to an 8:1 spatial scale having 32 grayscale values of 0→31, resulting in blocks 320 and 370, the gradient of block 320 increases to a maximum value, whereas block 370 appears to be a flat black square of zero gradient.

A multi-scale metric for reflecting the four dynamic range settings (1:1, 2:1, 4:1, and 8:1) shown in FIG. 3 at a single spatial scale setting is a 4-tuple. Assuming that the pixel activity is a 2D spatial gradient having a value between 0 and 1, with 0 indicating no vertical or horizontal edges and 1 indicating a maximum amount of vertical and horizontal edges, the multi-scale metric for block 305 (at the spatial scales illustrated as blocks 305, 310, 315, and 320) is represented as [0.8, 0.9, 1.0, 1.0], and the multiscale metric for block 355 (at the spatial scales illustrated as blocks 355, 360, 365, and 370) is represented as [0.2, 0.1, 0, 0]. The multi-scale metric of [0.8, 0.9, 1.0, 1.0] indicates that the attenuation of high frequencies is more likely to be noticed for block 305, whereas the multi-scale metric of [0.2, 0.1, 0, 0] indicates that the attenuation of high frequencies is less likely to be noticed for block 355. Thus, by incorporating measures of 2D spatial gradients or other metrics of pixel activity at a plurality of dynamic ranges, the multi-scale metric provides an indication of the contribution of details from all contrast levels versus from only high contrast levels.

Figure 4:
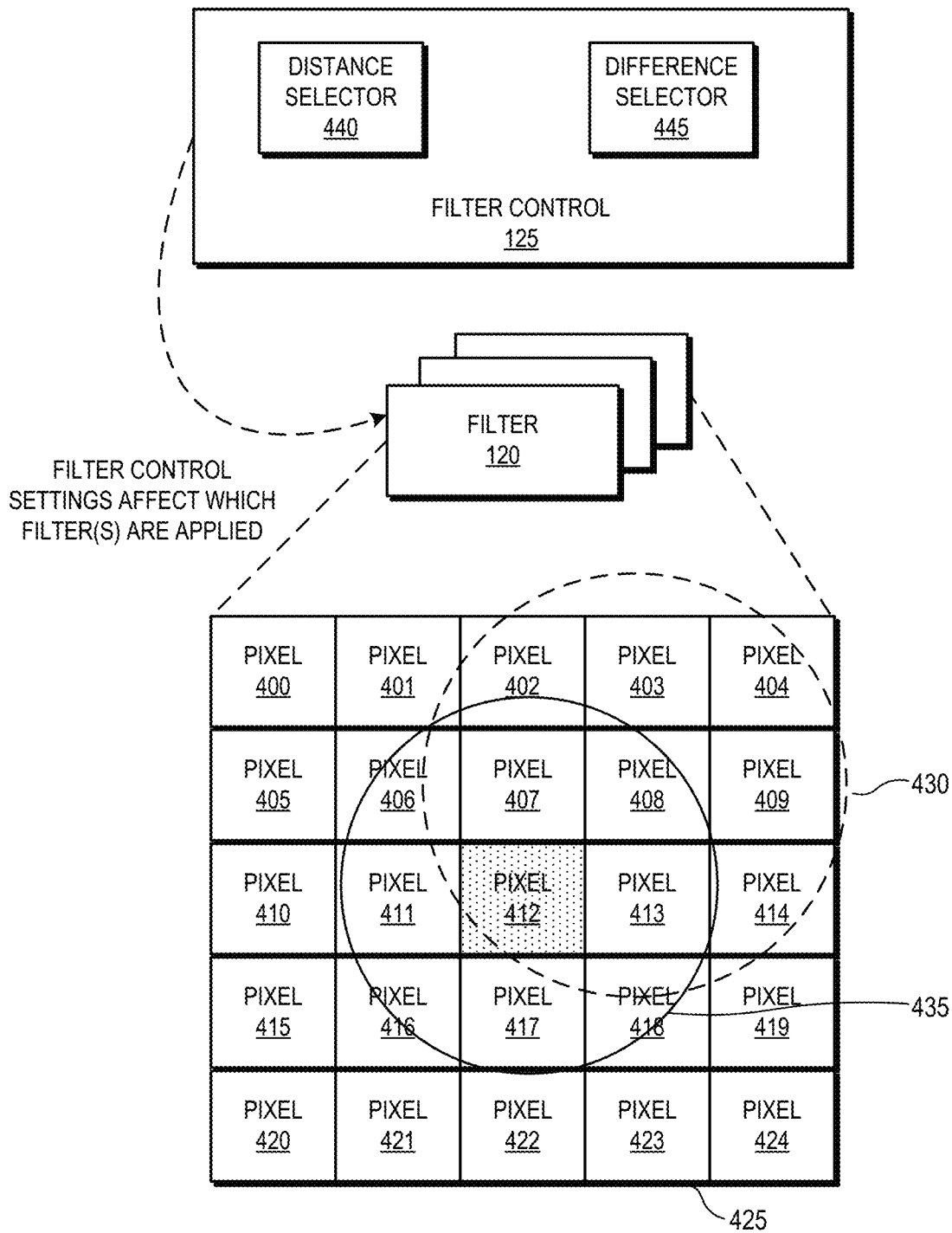
FIG. 4 is a block diagram of a filter control of the pre-processing module applying filters having different settings to a portion of a picture in accordance with some embodiments.

FIG. 4 illustrates the filter control 125 of the pre-processing module 110 applying N bilateral blurring filters 120 having different settings to a portion of a picture in accordance with some embodiments. The filter control 125 includes a distance selector 440 and a difference selector 445, each of which may be implemented as hard-coded logic, programmable logic, software executed by a processor, or a combination thereof. By adjusting the distance threshold of the bilateral blurring filters 120 with the distance selector 440 and the difference threshold of the bilateral blurring filters 120 with the difference selector 445, the filter control 125 effectively generates a different filter 120 for each set of distance threshold and difference threshold settings. Other embodiments employ other types of filters having additional or different parameters.

After the characterization module 115 has characterized a block, the filter control 125 applies a plurality of filters 120 to the block. To illustrate, for a block 425 including pixels 400-424, of which pixel 412 is the pixel under study (i.e., the pixel with which other pixels in the block will potentially be blurred), the filter control 125 applies a first filter 120 having a first distance threshold and a first difference threshold. When applied to the block 225 by the pre-processing module 110, the first filter 120 blurs pixels 406, 407, 408, 411, 413, 416, 417, and 418 in the area 435 with the pixel 412 under study. When the filter control 125 applies a second filter 120 having a second distance threshold and a second difference threshold to the block 425, the second filter 120 blurs pixels 402, 403, 404, 407, 408, 409, 413, and 414 in the area 430 with the pixel 412 under study.

Figure 5:
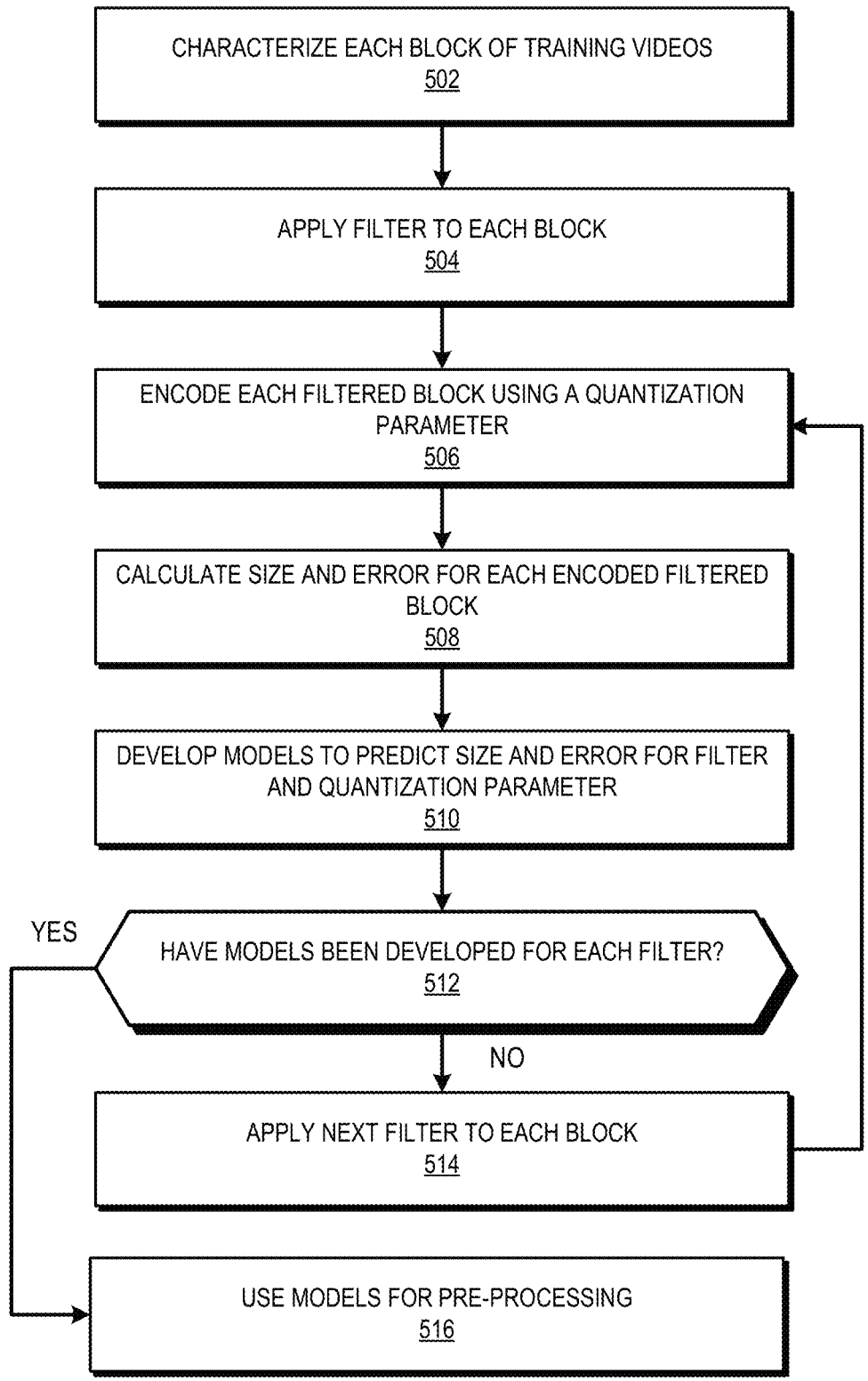
FIG. 5 is a flow diagram illustrating a method for training models to predict sizes and distortion of blocks filtered with different filters in accordance with some embodiments.

FIG. 5 is a flow diagram illustrating a method 500 for training models to predict sizes and distortion (referred to as errors) of blocks filtered with different filters in accordance with some embodiments. The method 500 is implemented in some embodiments of the processing system 100 shown in FIG. 1. At block 502, the characterization module 115 characterizes each block of a plurality of blocks. In some embodiments, the characterization module 115 characterizes the blocks using a multi-scale metric. In other embodiments, the characterization module 115 characterizes the blocks based on other metrics such as colorfulness, contrast, or noisiness. At block 504, the filter control 125 applies a first filter 120 to each block. At block 506, the pre-processing module 110 encodes the filtered blocks using a quantization parameter. At block 508, the predictor 130 collects (or calculates) a size and error for each encoded filtered block. At block 510, the predictor 130 develops a regression model to predict a size of a block when filtered with the first filter and encoded using the quantization parameter and a regression model to predict an error of a block when filtered with the first filter and encoded using the quantization parameter. At block 512, the pre-processing module 110 determines whether the predictor 130 has developed size and error models for all of the N filters being evaluated.

If, at block 512, the pre-processing module 110 determines that the predictor 130 has not developed a size and error model for each filter being evaluated, the method flow continues to block 514. At block 514, the filter control 125 applies the next filter 120 to each of the plurality of blocks. From there, the method flow continues back to block 506. If, at block 512, the pre-processing module 110 determines that the predictor 130 has developed a size and error model for each of the N filters being evaluated, the method flow continues to block 516. At block 516, the pre-processing module 110 uses the size and error models developed for each of the N filters 120 for pre-processing a picture or video, as described further in FIG. 6.

Figure 6:
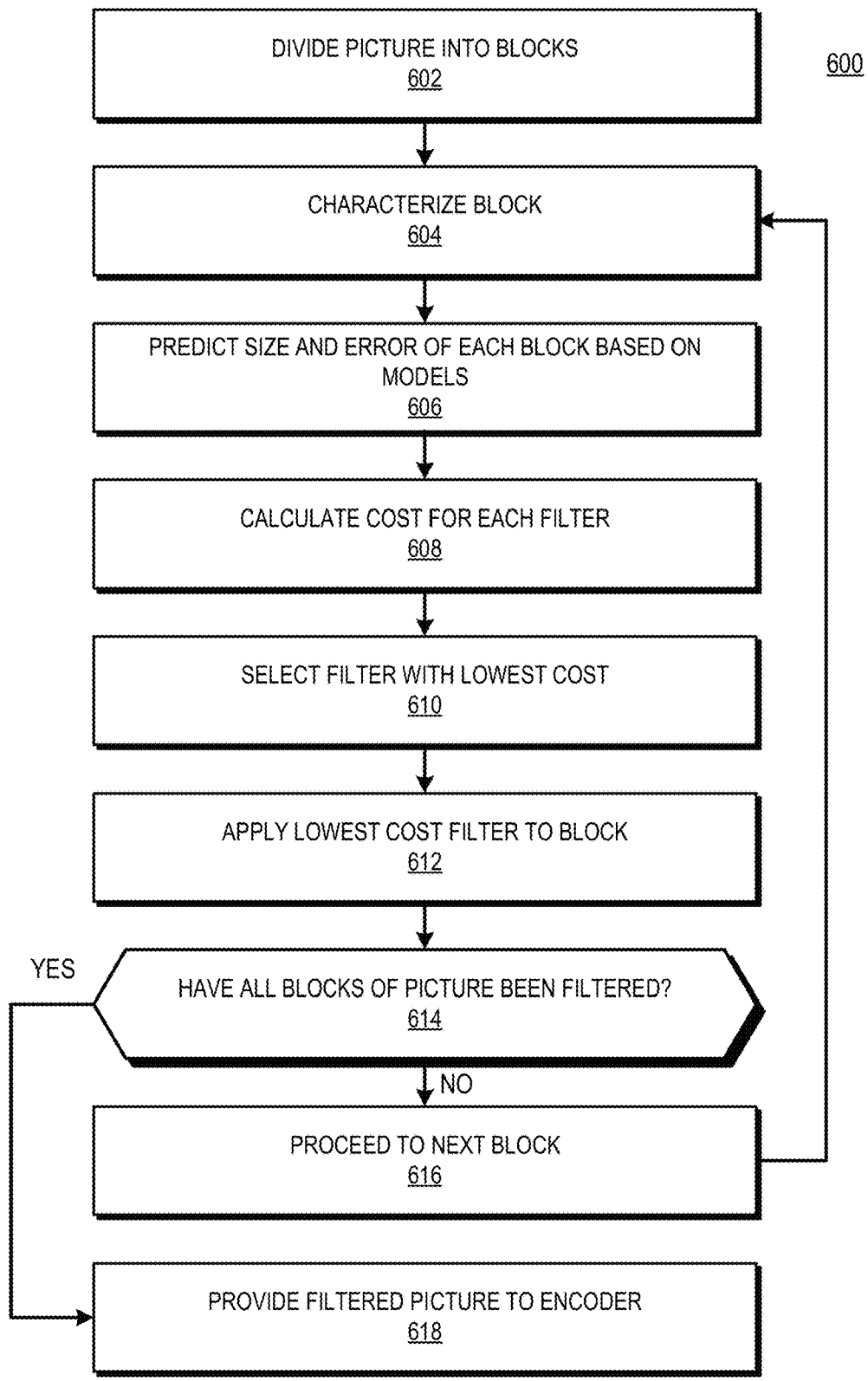
FIG. 6 is a flow diagram illustrating a method for filtering blocks of a picture using a filter having a lowest cost for each block in accordance with some embodiments.

FIG. 6 is a flow diagram illustrating a method 600 for filtering blocks of a picture using a filter having a lowest cost for each block in accordance with some embodiments. The method 600 is implemented in some embodiments of the processing system 100 shown in FIG. 1. At block 602, the processing system 100 divides the picture into blocks. At block 604, the characterization module 115 characterizes a first block of the picture using the same characterization method that was used in the training step for training the regression models, as discussed in reference to FIG. 5. At block 606, the predictor 130 calculates a predicted size of the first block when filtered using each of the N filters 120 by inputting the characterization of the first block into each of the N size models (one size model developed for each of N filters 120). The predictor 130 also calculates a predicted error of the first block when filtered using each of the N filters 120 by inputting the characterization of the first block into each of the N error models (one error model developed for each of N filters 120).

At block 608, the cost calculator 135 calculates a cost associated with applying each of the N filters 120 based on the predicted size and predicted error of a block having the characteristics of the first block when filtered using each filter 120. In some embodiments, the cost is based on a cost function that is the product of the square of the size model and the square root of the error model. At block 610, the filter selector 140 selects the filter predicted to incur the lowest cost for the first block. At block 612, the pre-processing module 110 applies the lowest cost filter to the first block. At block 614, the pre-processing module 110 determines whether every block of the picture (or video) of interest has been filtered. If, at block 614, the pre-processing module 110 determines that every block of the picture has not been filtered, the method flow continues to block 616. At block 616, the pre-processing module 110 continues to the next block of the picture, and the method flow continues back to block 604. If, at block 614, the pre-processing module 110 determines that every block of the picture has been filtered, the method flow continues to block 618. At block 618, the pre-processing module provides the filtered picture to the encoder 150.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   characterizing each block of a plurality of blocks of one or more pictures based on metrics comprising at least one of spatial gradient, colorfulness, contrast, or noisiness;
   applying a first filter to filter each block of the plurality of blocks;
   encoding each of the plurality of blocks filtered with the first filter using a first quantization parameter;
   calculating a size and an error of each of the plurality of blocks encoded and filtered with the first filter;
   predicting a size and an error of a first block of a first picture based on a characterization of the first block and the characterizations and the sizes and errors of each of the plurality of blocks, wherein the first block is filtered with the first filter and encoded using the first quantization parameter; and
   applying the first filter to the first block in response to a cost of the first filter, based on the predicted size and error, being below a threshold.

2. The method of claim 1, further comprising:
   applying a second filter to filter the plurality of blocks of the one or more pictures;
   encoding each of the plurality of blocks filtered with the second filter using the first quantization parameter;
   calculating a size and an error of each of the plurality of blocks encoded and filtered with the second filter;
   predicting a size and an error of the first block of the first picture based on a characterization of the first block and the characterizations and the sizes and errors of each of the plurality of blocks, wherein the first block is filtered with the second filter and encoded using the first quantization parameter; and
   applying the second filter to the first block in response to the cost of the first filter, exceeding a cost of the second filter, based on the predicted size and error of the first block wherein the first block is filtered with the second filter.

3. The method of claim 2, wherein the first filter and the second filter are blurring filters wherein applying the first filter comprises:
  modulating a first control setting indicating a difference in values between a sample pixel of the first block and a candidate pixel of the first block for inclusion in a blur comprising the sample pixel; and wherein applying the second filter comprises:
  modulating a second control setting indicating a distance between the sample pixel and the candidate pixel for inclusion in the blur comprising the sample pixel, wherein
  at least one of the first control setting and the second control setting of the first filter differs from the first control setting and the second control setting of the second filter.

4. The method of claim 2, wherein the first filter comprises one of a bilateral blurring filter, a temporal filter, a spatio-temporal filter, and a motion-compensated filter, and the second filter comprises one of a bilateral blurring filter, a temporal filter, a spatio-temporal filter, and a motion-compensated filter, different from the first filter.

5. The method of claim 2, further comprising:
  providing the first block filtered with the first filter or the second filter to an encoder.

6. The method of claim 5, wherein the cost function for the first filter is based on the characterizations, the calculated sizes, and the calculated errors of each of the plurality of blocks wherein the plurality of blocks are filtered with the first filter and encoded using the first quantization parameter and the cost function for the second filter is based on the characterizations, the calculated sizes, and the calculated errors of each of the plurality of blocks wherein the plurality of blocks are filtered with the second filter and encoded using the first quantization parameter.

7. The method of claim 1, wherein characterizing is based on a multi-scale metric for each of the plurality of blocks, the multi-scale metric comprising coefficients based on estimated levels of pixel activity of each block for at least one of a plurality of spatial compression scales and a plurality of dynamic range scales, the multiscale metric indicating how bit allocation or assignment of a quantization parameter is predicted to affect perceptual quality of each block.

8. A method, comprising:
  calculating a cost of applying a first filter and a cost of applying a second filter different from the first filter to a first block of a picture, wherein the cost of the first filter is based on a characterization based on metrics comprising at least one of spatial gradient, colorfulness, contrast, or noisiness, first predicted size and first predicted error for the first block, wherein the first block is filtered using the first filter and encoded using a first quantization parameter, and the cost of the second filter is based on the characterization, second size and second error for the first block, wherein the first block is filtered using the second filter and encoded using the first quantization parameter;
  selecting the first filter or the second filter, based on the cost of the first filter and the cost of the second filter;
  applying the selected filter to filter the first block; and
  providing the filtered first block to an encoder for encoding the filtered first block.

9. The method of claim 8, wherein the first filter and the second filter are blurring filters comprising:
  a first control setting indicating a difference in values between a sample pixel of the first block and a candidate pixel of the first block for inclusion in a blur comprising the sample pixel; and
  a second control setting indicating a distance between the sample pixel and the candidate pixel for inclusion in the blur comprising the sample pixel, wherein
  at least one of the first control setting and the second control setting of the first filter differs from the first control setting and the second control setting of the second filter.

10. The method of claim 8, wherein each of the first filter and the second filter comprises one of a bilateral blurring filter, a temporal filter, a spatio-temporal filter, and a motion-compensated filter.

11. The method of claim 8, further comprising:
  characterizing the first block of the first picture.

12. The method of claim 8, further comprising:
  predicting the first size and the first error for the first block, wherein the first block is filtered using the first filter and encoded using the first quantization parameter; and
  predicting the second size and the second error for the first block, wherein the first block is filtered using the second filter and encoded using the first quantization parameter.

13. The method of claim 12, further comprising:
  training a model to predict the first size of the first block and a model to predict the first error of the first block based on the first filter and the first quantization parameter; and
  training a model to predict the second size of the first block and a model to predict the second error of the first block based on the second filter and the first quantization parameter.

14. The method of claim 8, wherein the characterization is based on a multi-scale metric for the first block, the multi-scale metric comprising coefficients based on estimated levels of pixel activity of the first block for at least one of a plurality of spatial compression scales and a plurality of dynamic range scales, the multi-scale metric indicating how bit allocation or assignment of a quantization parameter is predicted to affect perceptual quality of the first block.

15. A device, comprising:
  a cost calculator to estimate of applying a first filter and a cost of applying a second filter different from the first filter to a first block of a picture, wherein the cost of the first filter is based on a characterization of the first block based on metrics comprising at least one of spatial gradient, colorfulness, contrast, or noisiness and a first predicted size and a first predicted error for the first block, wherein the first block is filtered using the first filter and encoded using a first quantization parameter, and the cost of the second filter is based on the characterization of the first block and a second size and a second error for the first block, wherein the first block is filtered using the second filter and encoded using the first quantization parameter;
  a filter selector to select the first filter or the second filter, based on the cost of the first filter and the cost of the second filter, and apply the selected filter to filter the first block; and
  an encoder to encode the filtered first block.

16. The device of claim 15, wherein the first filter and the second filter are blurring filters comprising:
  a first control setting indicating a difference in values between a sample pixel of the first block and a candidate pixel of the first block for inclusion in a blur comprising the sample pixel; and a second control setting indicating a distance between the sample pixel and the candidate pixel for inclusion in the blur comprising the sample pixel, wherein at least one of the first control setting and the second control setting of the first filter differs from the first control setting and the second control setting of the second filter.

17. The device of claim 15, wherein each of the first filter and the second filter comprises one of a bilateral blurring filter, a temporal filter, a spatio-temporal filter, and a motion-compensated filter.

18. The device of claim 15, further comprising:
a characterization module to characterize the first block of the first picture.

19. The device of claim 18, wherein the characterization module is to characterize the first block based on a multi-scale metric for the first block, the multi-scale metric comprising coefficients based on estimated levels of pixel activity of the first block for at least one of a plurality of spatial compression scales and a plurality of dynamic range scales, the multi-scale metric indicating how bit allocation or assignment of a quantization parameter is predicted to affect perceptual quality of the first block.

20. The device of claim 19, further comprising:
a predictor configured to:
train a model to predict the first size of the first block and a model to predict the first error of the first block based on characterizations of a plurality of blocks filtered using the first filter and encoded using the first quantization parameter; and
train a model to predict the second size of the first block and a model to predict the second error of the first block based on characterizations of the plurality of blocks filtered using the second filter and encoded using the first quantization parameter.

* * * * *

UNITED STATES PATENT AND TRADEMARK OFFICE
CERTIFICATE OF CORRECTION

PATENT NO. : 10,708,624 B1
APPLICATION NO. : 16/426487
DATED : July 7, 2020
INVENTOR(S) : Mehdi Saeedi et al.

It is certified that error appears in the above-identified patent and that said Letters Patent is hereby corrected as shown below:

In the Claims

At Column 14 Line 43, In Claim 15, please correct "a cost calculator to estimate of applying a first filter and" to be --a cost calculator to estimate a cost of applying a first filter and--

Signed and Sealed this
Twenty-seventh Day of September, 2022

Katherine Kelly Vidal
*Director of the United States Patent and Trademark Office*